US008160918B1

(12) United States Patent
 Blair et al.

(10) Patent No.: US 8,160,918 B1
(45) Date of Patent: Apr. 17, 2012

(54) METHOD AND APPARATUS FOR DETERMINING BRAND PREFERENCE

(75) Inventors: Margaret H. Blair, Islamorada, FL (US); Donald L. Jones, Newburgh, IN (US)

(73) Assignee: comScore, Inc., Reston, VA (US)

( * ) Notice: Subject to any disclaimer, the term of this patent is extended or adjusted under 35 U.S.C. 154(b) by 1453 days.

(21) Appl. No.: 11/330,628

(22) Filed: Jan. 12, 2006

Related U.S. Application Data

(60) Provisional application No. 60/643,925, filed on Jan. 14, 2005.

(51) Int. Cl.
 *G06Q 30/00* (2012.01)
(52) U.S. Cl. ...................................................... 705/7.32
(58) Field of Classification Search ................... 705/10, 705/7.32
 See application file for complete search history.

(56) References Cited

U.S. PATENT DOCUMENTS

| | | | | |
|---|---|---|---|---|
| 5,041,972 | A * | 8/1991 | Frost | 705/10 |
| 7,103,561 | B1 * | 9/2006 | Sarkisian et al. | 705/10 |
| 2003/0028383 | A1 * | 2/2003 | Guerin et al. | 704/275 |
| 2003/0191682 | A1 * | 10/2003 | Shepard et al. | 705/10 |
| 2004/0116779 | A1 * | 6/2004 | Bien | 600/300 |
| 2004/0225553 | A1 * | 11/2004 | Broady et al. | 705/10 |
| 2005/0177388 | A1 * | 8/2005 | Moskowitz et al. | 705/1 |
| 2006/0149614 | A1 * | 7/2006 | Suzuki et al. | 705/10 |

OTHER PUBLICATIONS

Kevin E. Voss, et al., "Measuring the Hedonic and Utilitarian Dimensions of Consumer Attitude," 50 Journal of Marketing Research 310-20 (2003).*
Albert Mehrabian & Robert de Wetter, "Experimental Test of an Emotion-Based Approach to Fitting Brand Names to Products," 72 Journal of Applied Psychology 125-30 (1987).*
Kevin Lane Keller, et al., "The Effects of Brand Name Suggestiveness of Advertising Recall," 62 Journal of Marketing 48-57 (1998).*
Mita Sujan & James R. Bettman, "The Effects of Brand Positioning Strategies on Consumers' Brand and Category Perceptions: Some Insights from Schema Research," 26 Journal of Marketing Research 454-67 (1989).*
Rajeev Batra & Olli T. Ahtola, "Measuring the Hedonic and Utilitarian Sources of Consumer Attitudes," 2 Marketing Letters 159-70 (1990).*
Joanne Lynch & Leslie de Chernatony, "The Power of Emotion: Brand Communication in Business-to-Business Markets," 11 Brand Management 403-19 (2004).*
Karen A. Machleit & Sevgin A. Eroglu, "Describing and Measuring Emotional Response to Shopping Experience," 49 Journal of Business Research 101-11 (2000).*
William J. Havlena & Morris B. Holbrook, "The Varieties of Consumption Experience: Comparing Two Typologies of Emotion in Consumer Behavior," 13 Journal of Consumer Research 394-404 (1986).*

* cited by examiner

*Primary Examiner* — Neil Kardos

(74) *Attorney, Agent, or Firm* — Barnes & Thornburg

(57) ABSTRACT

A method for determining brand preference of a consumer includes presenting the consumer with a number of brand choices and determining a brand selected by the consumer from the number of brand choices. The method also includes determining an emotional response and a rational response of the consumer to the selected brand. The method may include generating a graph(s) indicative of the brand preference, the emotional responses, and/or the rational responses of the consumer to the selected brand. The graph(s) may be indicative of such preference and/or responses at a point in time or over a period of time. Additionally, the method may include determining the emotional and rational responses of the consumer to non-selected brands of the number of brand choices presented to the consumer.

15 Claims, 14 Drawing Sheets

| AREA OF INTEREST — 174 | BRAND X PREFERRED 176 | BRAND Y PREFERRED 178 |
|---|---|---|
| AUCTIONS | 104 | 81 |
| AUTOMOTIVE | 46 | 42 |
| BUSINESS TO BUSINESS | 102 | 140 |
| BUSINESS/FINANCE | 76 | 54 |
| CAREER SERVICES AND DEVELOPMENT | 158 | 110 |
| COMMUNITY | 139 | 72 |
| CORPORATE PRESENCE | 91 | 97 |
| DIRECTORIES/RESOURCES | 69 | 61 |
| EDUCATION | 79 | 39 |
| ENTERTAINMENT | 117 | 74 |
| GAMES | 163 | 200 |
| GOVERNMENT | 112 | 82 |
| HEALTH | 127 | 117 |
| HOBBIES/LIFESTYLE | 66 | 58 |
| ISP | 96 | 94 |
| NEWS/INFORMATION | 63 | 74 |
| PORTALS | 81 | 87 |
| REAL ESTATE | 64 | 29 |
| REGIONAL/LOCAL | 89 | 67 |
| RETAIL | 103 | 77 |
| SEARCH/NAVIGATION | 66 | 103 |
| SERVICES | 114 | 119 |
| SPORTS | 46 | 125 |
| TECHNOLOGY | 76 | 71 |
| TOTAL INTERNET | 100 | 100 |
| TRAVEL | 75 | 45 |

METHOD AND APPARATUS FOR DETERMINING BRAND PREFERENCE

This patent application claims priority to and the benefit of U.S. Provisional Patent Application Ser. No. 60/643,925 entitled "System and Method For Determining an Effect of Branding Activities" which was filed on Jan. 14, 2005, the entirety of which is expressly incorporated herein by reference.

BACKGROUND OF THE INVENTION

The present disclosure relates generally to systems and methods for determining brand preference, and more particularly to systems and methods for determining brand preference of consumers over a network.

Consumer preference for a brand of a product is a representation of the percentage of consumers of the product who prefer the brand of interest over brands of the same product as depicted in sales, market share, or stock price. Due to other factors such as pricing, availability, and marketing activities, brand preference may not correspond directly to market sales and market share. That is, while consumer preference of a brand may be high, market share for the brand may be lower or otherwise non-corresponding to the brand preference value because, for example, the brand may be easily available only in selected locations. However, changes in consumer brand preference may correspond with changes in brand sales, market share and market value. As such, knowledge of consumer preference for a particular brand and the underlying factors creating such consumer preference may be useful in determining, analyzing, and improving the effect of advertisement plans, marketing strategies, and the overall health of the brand as depicted in sales and/or market share.

SUMMARY OF THE INVENTION

The present invention comprises one or more of the features recited in the appended claims and/or the following features which, alone or in any combination, may comprise patentable subject matter:

According to one aspect, a method for determining a brand preference of a consumer may include presenting a number of brands to the consumer. The number of brands may be presented to the consumer by, for example, displaying images of the number of brands to the consumer. Such images may be embodied as three-dimensional images, simulated store shelves, word lists including the brand names, or images of the packaging of the different brands. The images may be displayed to the consumer over a network such as the Internet. The method may also include determining a brand selected by the consumer from the number of presented brands. The selected brand may be determined by receiving data indicative of a selection of the consumer over a network.

The method may also include determining an emotional response of the consumer to the selected brand. The emotional response of the consumer may be determined by displaying a number of icons indicative of a range of emotional responses to the consumer and determining a selection by the consumer of one of the icons. The icons may include an icon indicative of an amount of pleasure experienced by the consumer in response to the selected brand, an icon indicative of an amount of arousal experienced by the consumer in response to the selected brand, and/or an icon indicative of an amount of dominance experienced by the consumer in response to the selected brand. Alternatively, the emotional response of the consumer may be determined based on the consumer's response to a number of questions, physical responses of the consumer to the brand such as change in heart rate, Galvanic skin response, and the like. The method may further include generating a graph having a pleasure axis and an arousal axis and generating indicia on the graph indicative of an average pleasure response and an average arousal response to the selected brand by a number of consumers.

The method may yet further include determining a rational response of the consumer to the selected brand. The rational response may be determined by presenting a number of questions to the consumer related to the selected brand. The number of questions may facilitate the determining of a value indicative of the uniqueness of the selected brand to the consumer and/or a value indicative of whether the consumer has experienced new information concerning the selected brand. The method may include generating a graph having a uniqueness axis and a new information axis and generating indicia on the graph representing an average of values indicative of the uniqueness of the selected brand to a number of consumers and of an average of values indicative of whether the number of consumer has experienced new information concerning the selected brand. Additionally, the method may include determining interests of the consumer. The interests of the consumer may be determined based on web sites, such as Internet web sites, visited by the consumer.

According to another aspect, a method for determining a brand preference of a consumer may include presenting images of a number of brands to the consumer and determining a brand selected by the consumer from the number of brands. The images may be presented to the consumer by transmitting the images over a network such as the Internet. The selected brand may be determined by receiving data indicative of the selected brand over the network. The method may also include determining first data indicative of an emotional response of the consumer to the selected brand. The first data may be embodied as two-dimensional data. The first data may be determined, for example, by transmitting a number of icons indicative of a range of emotional responses over a network. The icons may include an icon indicative of an amount of pleasure experienced by the consumer in response to the selected brand, an icon indicative of an amount of arousal experienced by the consumer in response to the selected brand, and/or an icon indicative of an amount of dominance experienced by the consumer in response to the selected brand. The method may also include determining second data indicative of a rational response of the consumer to the selected brand. The second data may also be embodied as two-dimensional data. The second data may be determined by transmitting a number of questions related to the selected brand over a network, displaying the number of questions to the consumer, and receiving data indicative of the consumer's answers to the number of questions via the network. Determining the second data may also include determining a value indicative of the uniqueness of the selected brand to the consumer and a value indicative of whether the consumer has experienced new information concerning the selected brand.

According to a further aspect, a method for determining a brand preference of a consumer for a predetermined brand may include determining an emotional response of the consumer to the predetermined brand and determining a rational response of the consumer to the predetermined brand. The method may also include determining a value indicative of the brand preference of the consumer for the predetermined brand based on the emotional response and the rational response.

According to yet a further aspect, a computer system may include a processor and a memory device. The memory device may be electrically coupled with the processor and may have stored therein a plurality of instructions, which when executed by the processor, may cause the processor to transmit images of a number of brands to a consumer over, for example, a network. The plurality of instructions may also cause the processor to receive first data indicative of a selection by the consumer of a brand from the number of brands. The plurality of instructions may further cause the processor to receive second data indicative of an emotional response of the consumer to the selected brand. For example, the processor may receive a first value indicative of an amount of pleasure experienced by the consumer in response to the selected brand, a second value indicative of an amount of arousal experienced by the consumer in response to the selected brand, and a third value indicative of an amount of dominance experienced by the consumer in response to the selected brand. The first value, the second value, and the third value may be two-dimensional values. The plurality of instructions may also cause the processor to transmit a number of icons to the consumer over a network. The number of icons may include a first icon indicative of an amount of pleasure experienced by the consumer in response to the selected brand, a second icon indicative of an amount of arousal experienced by the consumer in response to the selected brand, and a third icon indicative of an amount of dominance experienced by the consumer in response to the selected brand. The plurality of instructions may also cause the processor to receive third data indicative of a rational response of the consumer to the selected brand. For example, the processor may receive a first value indicative of the uniqueness of the selected brand to the consumer and a second value indicative of whether the consumer has experienced new information concerning the selected brand. The plurality of instructions may yet further cause to transmit a number of questions related to the selected brand over the network and receive fourth data indicative of the consumer's answers to the number of questions via the network.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which:

FIG. 10 is a list of interests of the number of consumers determined during the execution of the algorithm of FIG. 2;

DETAILED DESCRIPTION OF THE DRAWINGS

Figure 1:
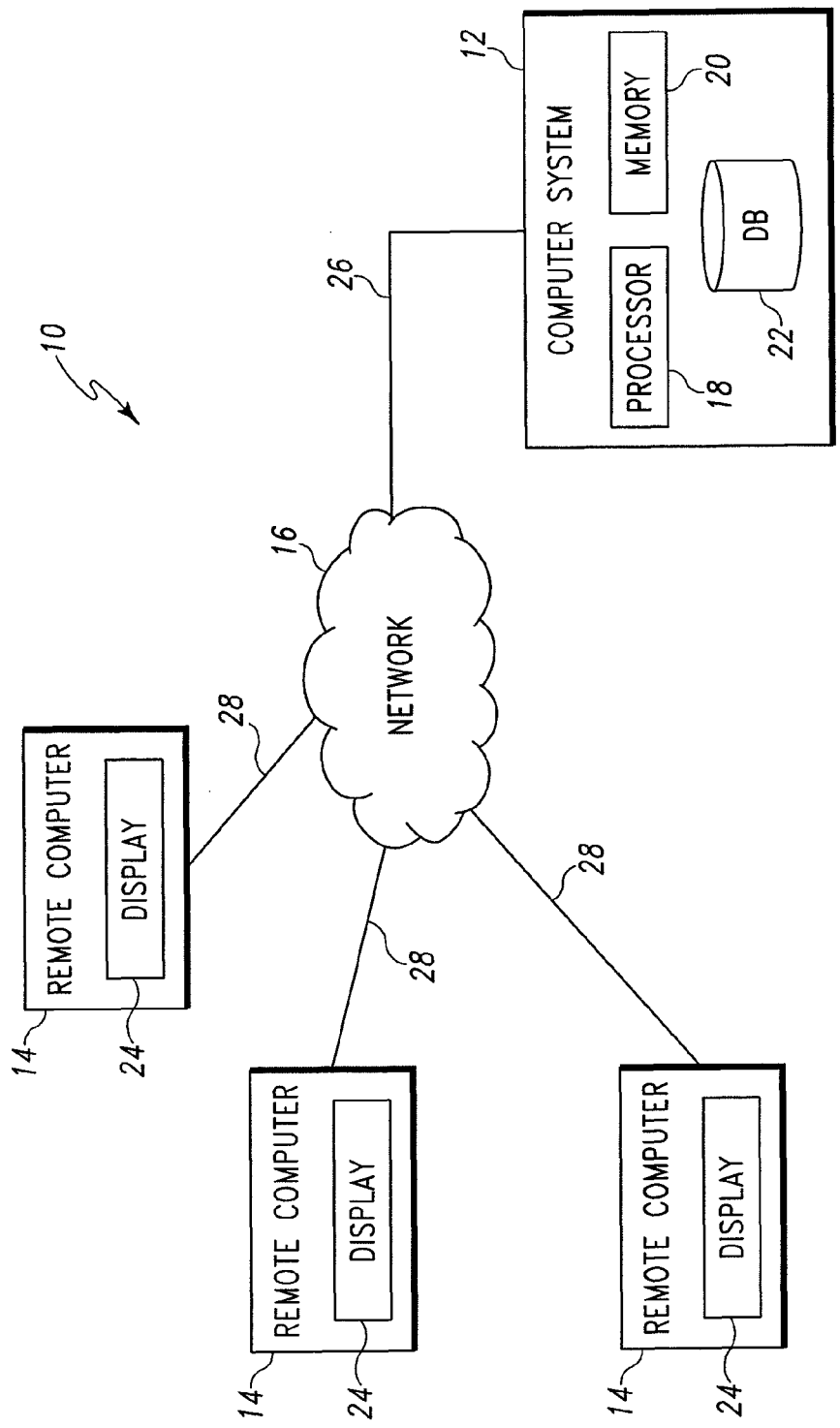
FIG. 1 is a simplified diagram of a network-based system for determining consumer preference for a number of brands of a product.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring to FIG. 1, a system 10 for determining consumer preference for a brand of a product includes a computer system 12 coupled with a number of remote computers 14 via a network 16. The computer system 12 includes a processor 18 and a memory device 20. The processor 18 is electrically coupled with the memory device 20 via suitable communication links such as wires, printed circuit board (PCB) traces, or the like. The processor 18 may be embodied as any type of processing device or collection of devices configured to perform the functions described herein such as, for example, a microcontroller, an application specific integrated circuit (ASIC), and/or a collection of discrete circuitry. The memory device 20 may be embodied as any type of memory device capable of storing data such as program code, data values, and the like. The memory device 20 may include any number of non-volatile memory devices such as a read only memory ("ROM"), any number of a volatile memory devices such as a random access memory ("RAM"), and/or other types of memory storage devices.

The computer system 12 also includes a database 22. The database 22 may be embodied as any type of database, electronic library, and/or file storage location. For example, the database 22 may be embodied as a structured database or as an electronic file folder or directory containing a number of separate files and an associated "look-up" table. Further, the database 22 may be stored on any suitable device. For example, the database 22 may be stored in a set of memory locations of, for example, the memory device 20 and/or a stored on a separate storage device such as a hard drive or the like. Additionally or alternatively, the database 22 may be embodied as a remote database located apart from the computer system 12. For example, the computer system 12 and the database 22 may be located in separate rooms or facilities from each other.

Each of the remote computers 14 include a number of components commonly associated with such machines. For example, although not shown in detail in the drawings, each of the remote computers 14 may include, amongst other things customarily included in such machines, a central processing unit ("CPU"), a non-volatile memory such as a read only memory ("ROM"), a volatile memory such as a random access memory ("RAM"), and one or more data storage devices. For example, as shown in FIG. 1, each of the remote computers 14 includes a display 24. Users may interact with the remote computers 14 using suitable input devices such as a keyboard and/or a mouse.

Typically, the computer system 12 is maintained by a brand preference analysis company. The remote computers 14 may also be maintained by the brand preference analysis company and may be located in, for example, a testing room or facility. Alternatively, one or more of the remote computers 14 may be under the control of one of the consumers and located at, for example, the home of the consumer. It should be appreciated that although only three remote computers 14 are illustrated in FIG. 1, the system 10 may include any number of remote computers 14.

As shown in FIG. 1, the computer system 12 is coupled to the network 16 via a communication link 26, whereas the remote computers 14 are coupled to the network 16 via a number of communication links 28. It should be appreciated that each of the communication links 26, 28 may be provided as any number or type of data link including both wired and wireless data links. Moreover, it should also be appreciated that one or more intervening modems (not shown), data routers (not shown), and/or internet service providers ("ISPs") (not shown) may be used to transfer the data between the computer system 12, the remote computers 14, and the network 16.

The network 16 of the present disclosure may be embodied as any type of network such as a local area network (LAN), a wide area network (WAN), or a publicly-accessible global network such as the Internet. Additionally, the network 16 may be a wired network, a wireless network, or a combination thereof and may use any communication technology and protocol to transfer data between the computer system 12 and the remote computers 14.

In operation, the computer system 12 is configured to determine a brand preference of a number of consumers. To do so, the computer system 12 transmits and receives data from the remote computers 14 via the network 16. The consumers interact with the computer system 12 via the remote computers 14 to, for example, make selections and provide data to the computer system 12.

Figure 2:
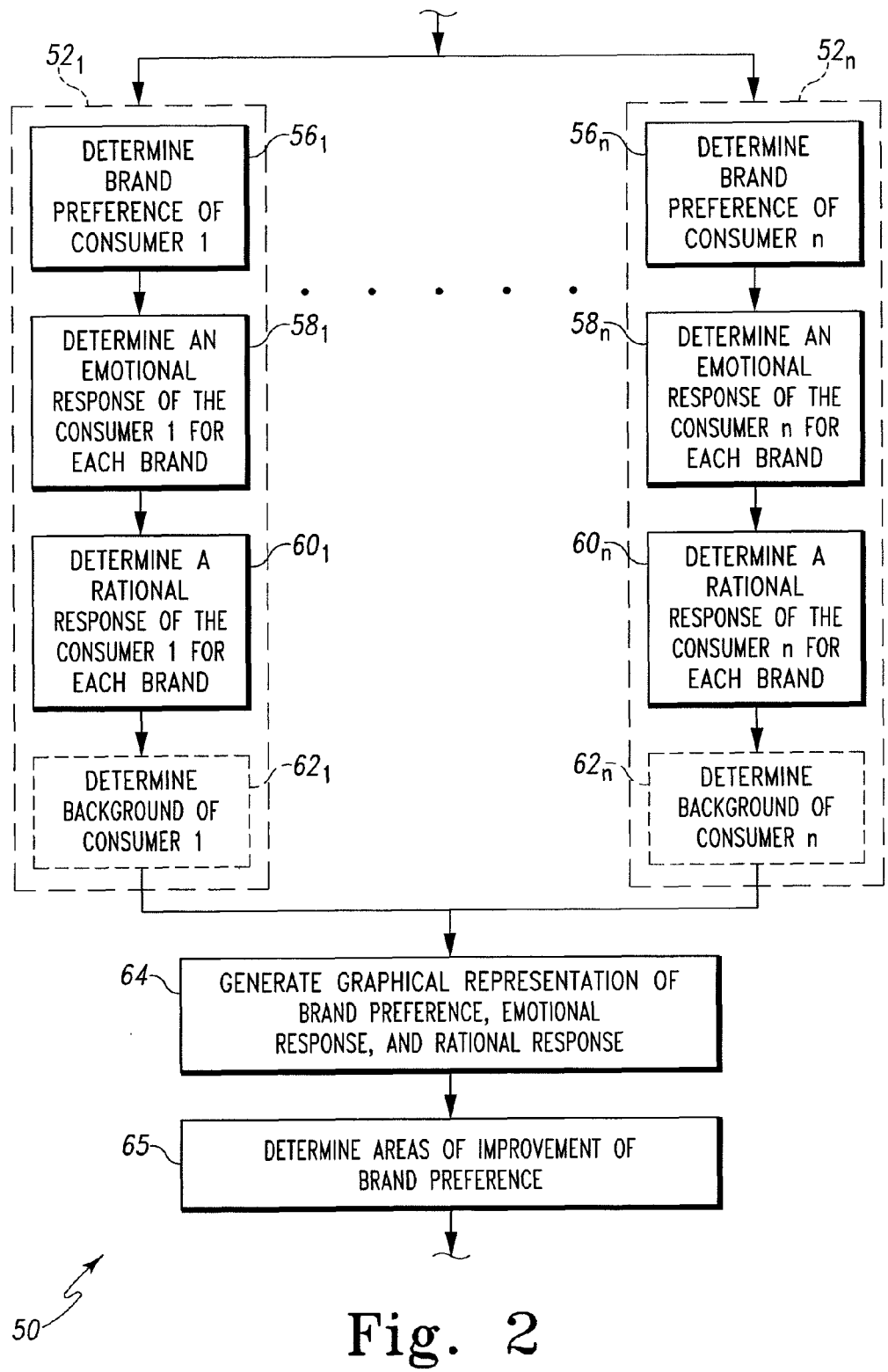
FIG. 2 is a flow diagram of an algorithm for determining consumer preference for a number of brands of a product that is executed by the system of FIG. 1.

Referring now to FIG. 2, in one embodiment, the computer system 12 executes an algorithm 50 for determining consumer preference for a number of brands of a product. The algorithm 50 includes a number of process steps $52_1$-$52_n$. In each process step $52_1$-$52_n$, the brand preference, emotional response, and rational response of an individual consumer of a pool of consumers is determined. The pool of consumers may be selected such that the consumers represent a pool of consumers of the product based on geographical area, interests, purchasing habits, or any other relational basis. One of the process steps $52_1$-$52_n$ is executed for each consumer of the pool of consumers. The process steps $52_1$-$52_n$ may be repeated for each category of products such that the consumer's brand preference, emotional response, and rational response to brands of a number of different products may be determined. The individual process steps $52_1$-$52_n$ may be executed sequentially or contemporaneously with each other. Each of the process steps $52_1$-$52_n$ are similar and, as such, the algorithm 50 will be described below in regard to a general process step 52, with the understanding that such description is applicable to each of the process steps $52_1$-$52_n$.

Figure 3:
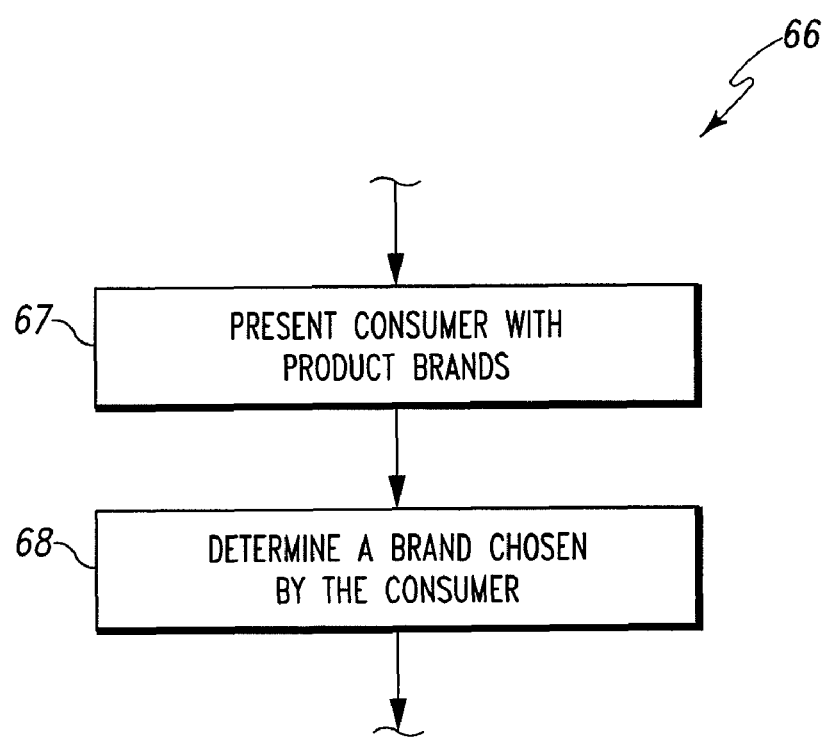
FIG. 3 is a flow diagram of a sub-routine of the algorithm of FIG. 2 for determining a brand preference of a consumer from a number of brands.

The process step 52 includes a number of sub-steps 56, 58, 60, and 62. In sub-step 56, the brand preference of the consumer is determined. To do so, the computer system 12 may execute an algorithm 66 for determine the consumer's brand preference from a number of brands. As illustrated in FIG. 3, the algorithm 66 beings with a process step 67 in which the consumer is presented with a number of product brands. The number of brands may include any number of different brands of any type of commercial product such as, for example, toothpaste, batteries, spaghetti sauce, etc. Additionally, the number of brands may include a predetermined brand of interest and/or be composed of the leading brands of the product of interest based on, for example, market share or market sales. The number of brands may be presented to the consumer in any form that facilitates the selection of one of the brands by the consumer. For example, the number of brands may be presented in paper form such as via a number of pictures of the branded product, as digital images of the branded product such as three-dimensional images, a virtual or simulated store shelf including the brands thereon, as a word list of the brands or logos of the brands, or the like.

Figure 7:
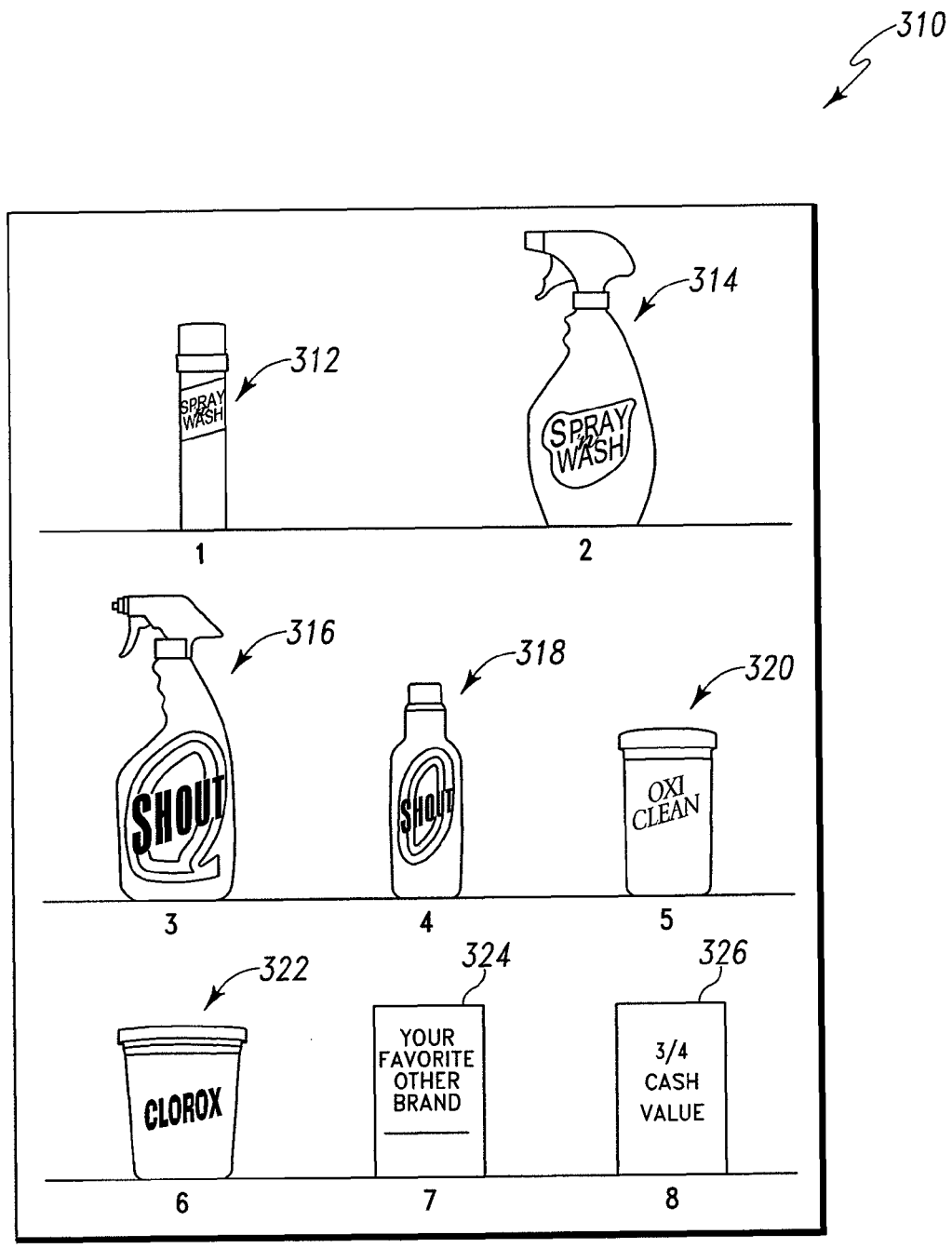
FIG. 7 is an illustration of a screen display presented to a consumer during the execution of the sub-routine of FIG. 3.

In one particular embodiment, the number of brands is embodied as images of the branded products that are displayed to the consumer on the display devices 24 of the remote computers 14. For example, as shown in FIG. 7, a selection screen 310 may be displayed to the consumer on the display device 24. The selection screen 310 includes a number of brands embodied as images 312-322. The images may be two or three dimensional images and, in one embodiment, are pictures of the branded products. As such, the consumer is presented with a virtual store shelf of brands of a product of interest. Because the images are of the retail packaging of the brands, the consumer may be exposed to similar influences as experienced in the retail environment. The selection screen 310 also include a selection box 324 wherein the consumer can submit their choice of brand if such brand is not presented as one of the images 312-322. Additionally, the selection screen 310 includes a "¾ cash value" selection box 326. The images 312-322 of the branded products may be stored in and retrieved from, for example, the database 22.

In process step 56, the computer system 12 determines a product brand selected by the respective consumer from the number of displayed brands. To do so, the consumer may be prompted to select the brand which he or she prefers. The consumer may select the brand, for example, by "clicking" or otherwise selecting the image 312-322 of the branded product displayed on the display device 24 of the remote computer 14. To avoid unknown influences on the consumer's selections, such as price, availability, and the like, in one embodiment, the consumer is informed that he or she has won the product as a prize and may select which brand of the product he or she would like to receive. In this way, the consumer's preference, without other influences, is determined.

Once the consumer has selected a brand from the number of brands displayed to the consumer on the display device 24, the remote computer 14 transmits data indicative of the consumer's selection to the computer system 12 via the network 16. In response, the computer system 12 may be configured to store the data in the database 22 for future analysis.

Figure 4:
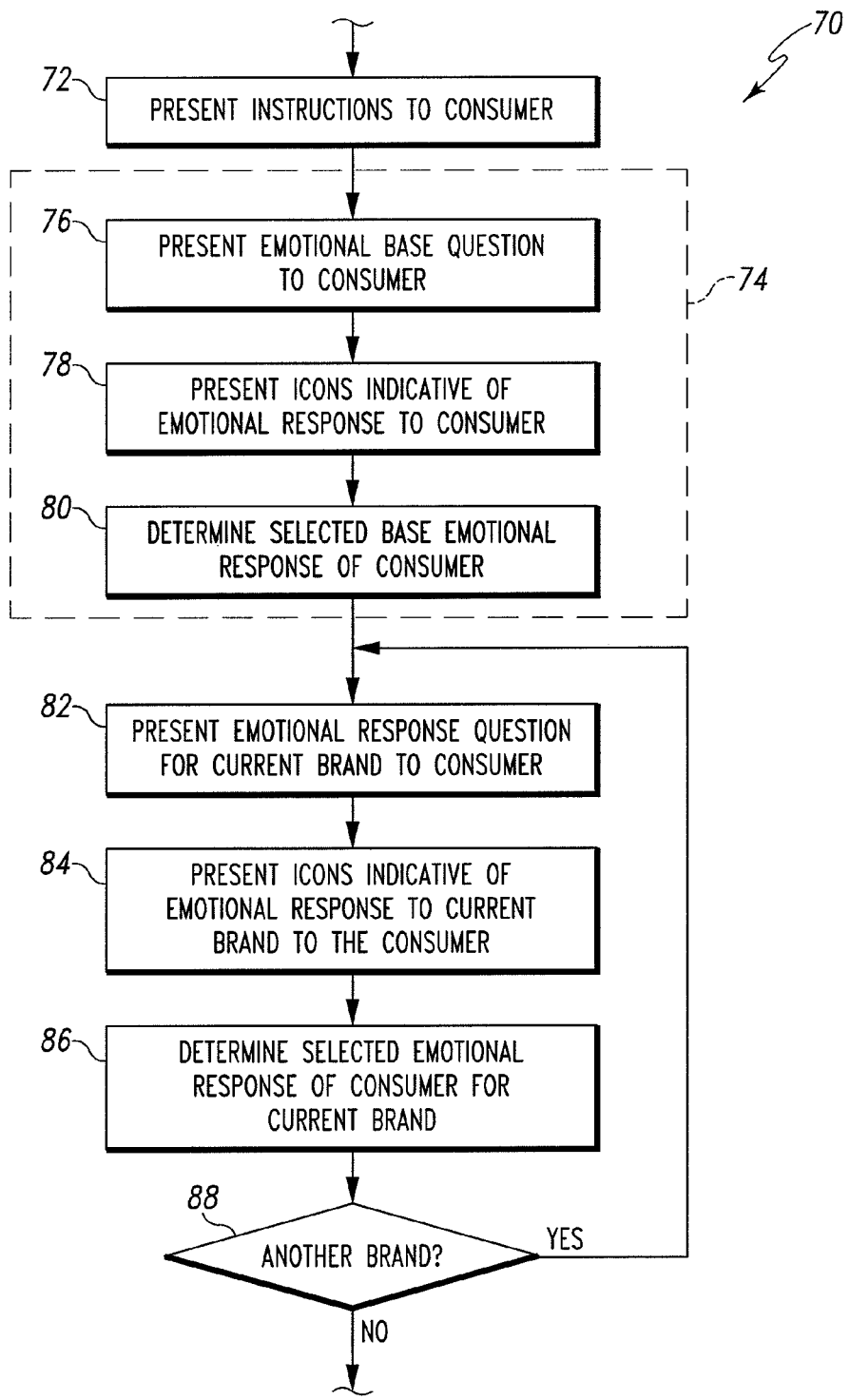
FIG. 4 is a flow diagram of another sub-routine of the algorithm of FIG. 2 for determining an emotional response of a consumer to the number of brands.

In process step 58, an emotional response of the consumer to each presented product brand is determined. The emotional response represents the consumer's emotional attachment and/or desire for the particular brand. To determine the emotional response of the consumer to the displayed brands, the computer system 12 may execute an algorithm 70 as illustrated in FIG. 4. Algorithm 70 begins with process step 72 in which instructions are provided to the consumer. The emotional response of the consumer to the brand is determined based on responses indicative of emotions of the consumer in regard to a product brand. To do so, the consumer may be presented with icons, images, or other indicia representing a range of different emotions. The consumer may then select or choose the icons or images that best represent the particular emotion (i.e., magnitude of the particular emotion) the consumer feels toward the brand. Accordingly, in process step 72 instructions are provided to the consumer. Such instructions may include explanation of the type of icons or images that will be displayed and what emotion and magnitude of emotion each icon or image represents. Additionally, the consumer may be instructed in how to select or choose one of the icons or images. For example, the consumer may select an icon or image by selecting a button associated with the icon or image.

Once the instructions have been provided to the consumer in process step 72, a base emotional response of the consumer is determined in process step 74. The base emotional response determines how the consumer typically feels (e.g., sad, depressed, anxious, happy, fulfilled, etc) without exposure to external stimuli such as the product brand. By determining a consumer's base emotional response, the emotional response to the brand subsequently provided by the consumer can be analyzed and/or normalized based on the base emotional response. For example, if a consumer is typically unhappy, a happy response to a product brand may be of particular significance.

Figure 8:
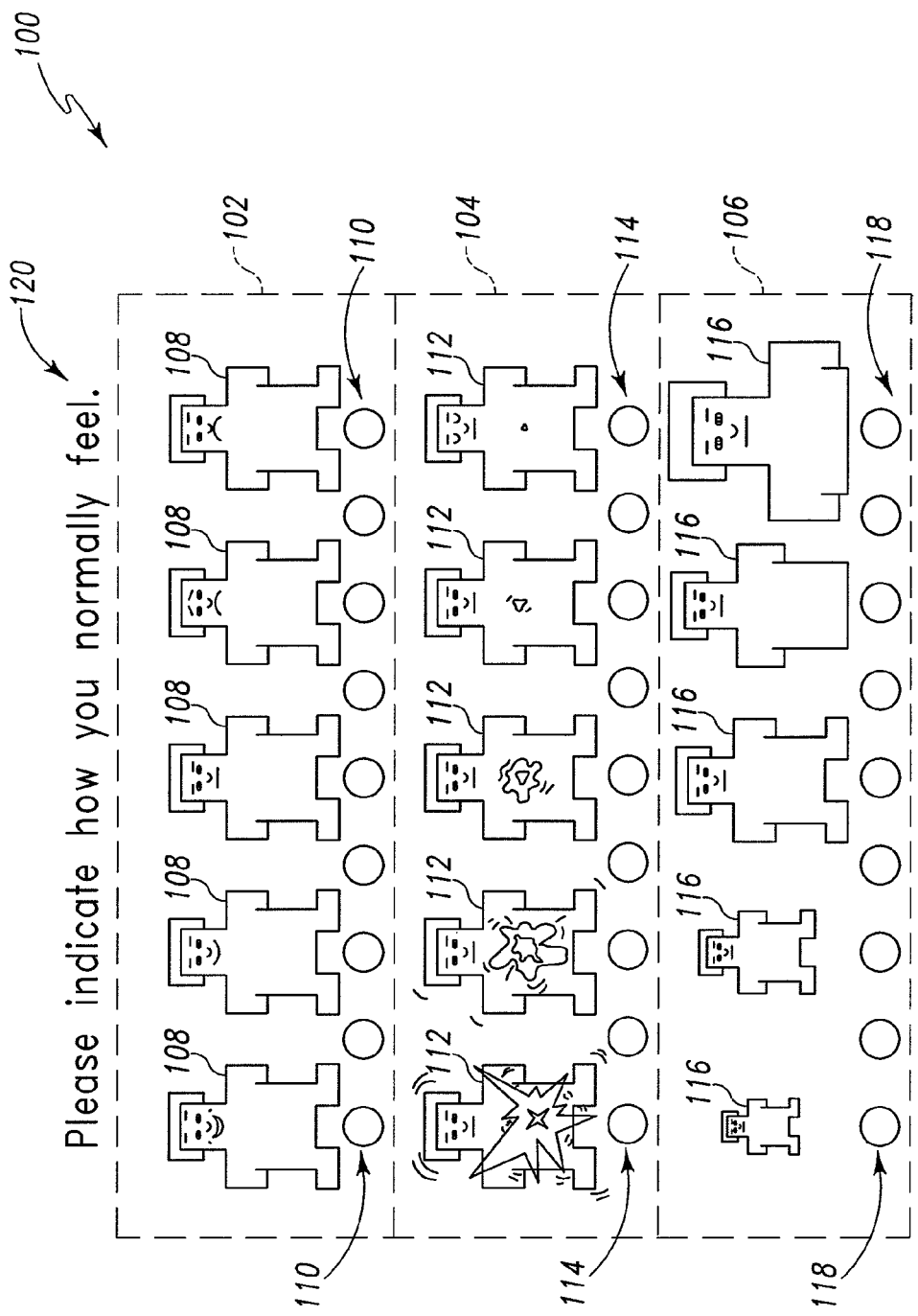
FIG. 8 is an illustration of a screen display presented to a consumer during the execution of the sub-routine of FIG. 4.

To determine a base emotional response, process step 74 includes a number of sub-steps 76, 78, 80. In process step 76, the consumer is presented with a base emotional response question designed to determine the base emotional response of the consumer. Additionally, in process step 78, the consumer is presented with icons indicative of a range of emotional responses that the consumer may select in response to the emotional response question presented in process step 76. For example, as illustrated in FIG. 8, in one embodiment, the consumer is presented with a screen display 100 having an emotional response question 120 located at a top portion of the screen display 100 and rows 102, 104, and 106, each having icons indicative of ranges of different emotions. The screen display 100 may be displayed to the consumer on the display device 24 of one of the remote computers 14 operated by the consumer. To do so, data representing the screen display 100 (e.g., images, Hypertext Markup Language (HTML), etc.) is transmitted from the computer system 12 to the remote computer 14 operated by the consumer via the network 16. In some embodiments, the data representing the screen display 100 may be stored in the database 22 and retrieved prior to transmitting the data to the remote computer 14.

As illustrated in FIG. 8, the row 102 includes a number of icons 108 indicative of an amount of pleasure that the consumer feels and ranges from "happy" or "elated" for the left-most icon 108 to "unhappy" or "sad" for the right-most icon 108. Row 104 includes a number of icons 112 indicative of an amount of arousal the consumer feels and ranges from "stimulated" or "involved" for the left-most icon 112 to "calm" or "bored" for the right-most icon 112. Row 106 includes a number of icons 116 indicative of an amount of dominance that the consumer feels and ranges from "not in control" or "cared for" for the left-most icon 116 to "in-control" or "dominant" for the right-most icon 116. As such, the collection of icons 108, 112, and 116 provide a range of pleasure, arousal, and dominance normally experienced by the consumer.

The screen display 100 also includes a row of selection buttons 110, 114, and 118 under the rows of icons 108, 112, and 116, respectively. The consumer may answer the emotional response question 120 by selecting the appropriate selection button 110, 114, 118 that is associated with the icon 108, 112, 116, respectively, which best represents the emotion of the consumer in response to the question 120. For example, if the consumer typically feels moderately happy, the consumer may select a button 110 located under or near a central icon 108, which represents moderate happiness. The consumer may select the buttons 110, 114, 118 by, for example, positioning a cursor over the desired button 110, 114, 118 and "clicking" the button 110, 114, 118.

In process step 80, the algorithm 70 determines the base emotional response of the consumer. To do so, data indicative of the buttons 110, 114, 118 selected by consumer in response to the base emotional question 120 is transmitted from the remote computer 14 to the computer system 12 via the network 16. The data may be embodied as numerical values indicative of the button 110, 114, 118 selected by the consumer. For example, in embodiments wherein the buttons 110, 114, 118 each include ten separate buttons, the ten separate buttons may be assigned a numerical value from 1 to 10, which represent the amount of pleasure, arousal, and dominance typically felt by the consumer. For example, a value of 10 for buttons 110 may indicate that the consumer is typically extremely happy. However, in other embodiments, other numerical values and schema may be used to identify the particular emotion and associated buttons 110, 114, 118 selected by the consumer. For example, in some embodiments, text data indicative of the emotions typically felt by the consumer may be transmitted from the remote computer 14 to the computer system 12 in process step 80. Regardless, the computer system 12 is configured to store the base emotional responses of the consumer in the database 22.

Figure 9:
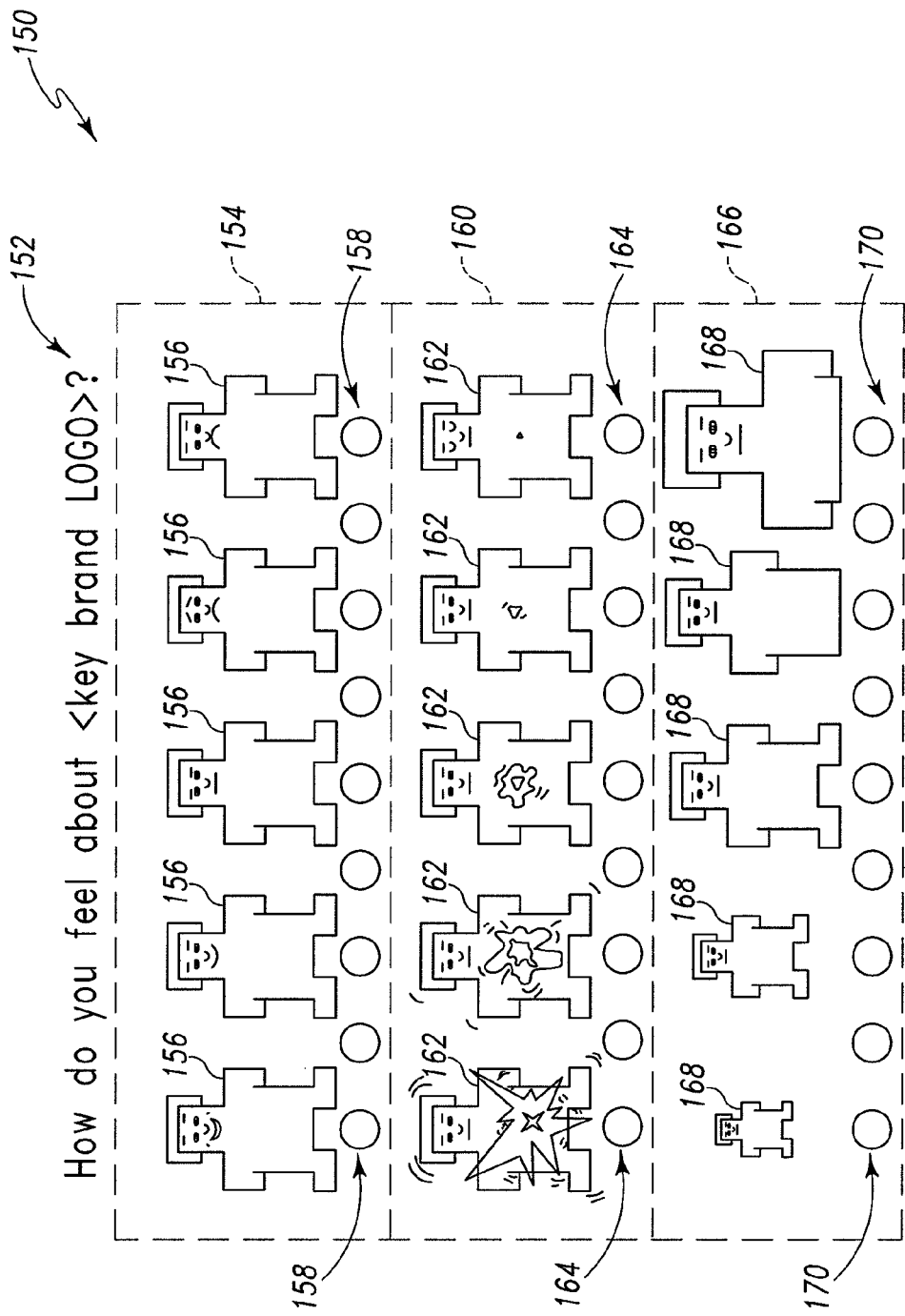
FIG. 9 is an illustration of another screen display presented to a consumer during the execution of the sub-routine of FIG. 4.

Once the base emotional response of the consumer has been determined in process step 74, an emotional response of the consumer to each product brand presented to the consumer in step 54 of algorithm 50 is determined in process steps 82, 84, 86, and 88. In process step 82, an emotional response question for the current brand is presented to the consumer in process step 82. Additionally, icons indicative of an emotional response to the current brand is presented to the consumer in process step 84. For example, as illustrated in FIG. 9, in one embodiment, the consumer is presented with a screen display 150 having an emotional response question 152 located at a top portion of the screen display 150, a row 154 having a number of icons 156 and associated selection buttons 158, a row 160 having a number of icons 162 and associated selection buttons 164, and a row 166 having a number of icons 168 and associated selection buttons 170. The icons 156, 162, and 168 are similar to the icons 108, 112, and 116, respectively, of the screen display 100 illustrated in FIG. 8. That is, the icons 156 include a number of icons 156 representing a range of pleasure, the icons 162 include a number of icons representing a range of arousal, and the icons 168 include a number of icons representing a range of dominance felt by the consumer in response to the product brand queried in the emotional response question 152.

Similar to the screen display 100, the screen display 150 may be displayed to the consumer on the display device 24 of one of the remote computers 14 operated by the consumer. To do so, data representing the screen display 150 (e.g., images, Hypertext Markup Language (HTML), etc.) is transmitted from the computer system 12 to the remote computer 14 operated by the consumer via the network 16. In some embodiments, the data representing the screen display 150 may be stored in the database 22 and retrieved prior to transmitting the data to the remote computer 14.

In process step 86, the algorithm determines the emotional response of the consumer to the current brand. To do so, the consumer responds to the emotional response question 152 by selecting one of each of the buttons 158, 164, 170 representing the amount of pleasure, arousal, and dominance felt by the consumer in response to the product brand as represented by the icons 156, 162, 168, respectively. Once the consumer has selected the desired buttons 158, 164, 170, data indicative of the button selections is transmitted from the remote computer 14 to the computer system 12 via the network 16. The data may be embodied as numerical values indicative of the buttons 158, 162, 170 selected by the consumer. For example, in embodiments wherein the buttons 158, 162, 170 each include nine separate buttons, the nine separate buttons may be assigned a numerical value from 1 to 9, which represent the amount of pleasure, arousal, and dominance, respectively, felt by the consumer in response to the brand. For example, in some embodiments, a value of 9 for buttons 156 indicates that the consumer experiences an extremely happy feeling in response to the product brand. However, in other embodiments, other numerical values and schema may be used to identify the particular emotion and associated buttons 158, 164, 170 selected by the consumer. For example, in some embodiments, text data indicative of the emotions experience by the consumer in response to the presented product brand may be transmitted from the remote computer 14 to the computer system 12 in process step 86. Further, in other embodiments, the emotional response of the consumer to the brand(s) may be determined in other ways. For example, in some embodiments, the emotional response of the consumer may be determined based on responses of the consumer to a number of questions, physical responses of the consumer to the brand(s) such as heart rate changes, Galvanic skin response, or the like. Regardless, the computer system 12 is configured to store the emotional responses of the consumer in the database 22.

Once the emotional response of the consumer to current product brand has been determined in process steps 82, 84, 86, the algorithm 70 determines if the consumer's emotional response for another brand should be determined in process step 88. If so, the algorithm 70 loops back to process steps 82, 84, and 86 in which the emotional response of the consumer for the next product brand is determined using the same methodology as described above in regard to the process steps 82, 84, and 86. The algorithm 70 continues to loop through process steps 82, 84, and 86 until the consumer's emotional response to each product brand presented to the consumer in process step 52 of the algorithm 50 has been determined. The consumer's emotional responses so determined are stored in the database 22 for later retrieval and analysis.

It should be appreciated that in the illustrative embodiment, the emotional response of the consumer is determined based on three primary emotions (i.e., pleasure, arousal, and dominance). However, in other embodiments, any number and type of emotions may be used that facilitate the determination of the consumer's emotional response to the brands. In one particular embodiment, the consumer's emotional response to the product brands is determined using the ADSAM® model of emotional response, which is commercially available from Adsam, Gainesville, Fla. In addition, although the illustrative emotional response question 152 simply asks the consumer how he/she feels about each product brand, the emotional response question may be replaced with alternative questions (e.g., more complex questions) and/or supplemented with additional questions designed to determine the consumer's emotional response to the product brands.

Figure 5:
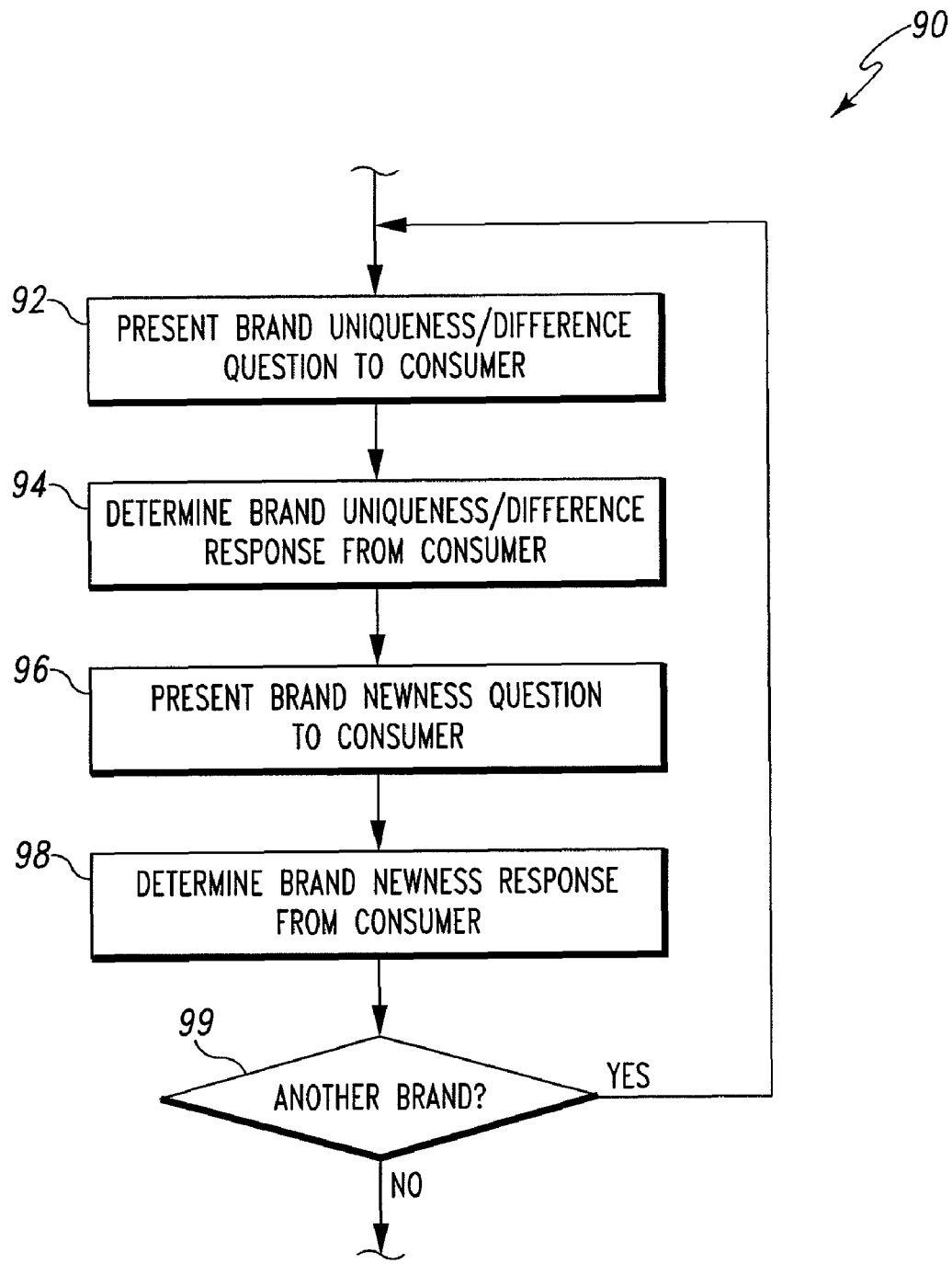
FIG. 5 is a flow diagram of another sub-routine of the algorithm of FIG. 2 for determining a rational response of a consumer to the number of brands.

Referring back to FIG. 2, after the emotional response of the consumer to the product brands has been determined in process step 58 of algorithm 50, the rational response of the consumer to the product brands is determined in process step 60. The rational response represents how the consumer perceives the product brand in the marketplace in relation to other brands. To determine the rational response of the consumer to the product brands, each brand's "uniqueness" and "newness" is determined. To do so, the computer system 12 may execute an algorithm 90 as illustrated in FIG. 5. The algorithm 90 begins with process step 92 in which a brand uniqueness or difference question is presented to the consumer for the current brand. The uniqueness question may be presented to the consumer by transmitting data representing the uniqueness question from the computer system 12 to the remote computer 14 being operated by the consumer. The uniqueness question may be embodied as any type of question or questions designed to determine how unique the current brand is in the consumer's opinion to other brands of the same product. For example, in one particular embodiment the uniqueness questions is embodied as "how unique and different is <BRAND> from other <PRODUCT CATEGORY> brands?" The uniqueness question includes a range of predetermined responses such that answers from the number of consumers may be pooled and analyzed. For example, in one particular embodiment, the possible answers to the uniqueness question include "extremely unique and different", "very unique and different", "somewhat unique and different", "slightly unique and different", and "not at all unique and different". The consumer may respond to the uniqueness question by selecting one of the possible answers by, for example, selecting a button or the like presented in association with the desired answer on the display device 24 of the remote computer 14 being operated by the consumer.

In process step 94, the consumer's response to the uniqueness question presented in process step 92 is determined. To do so, data indicative of the consumer's answer or selection is transmitted from the remote computer 14 to the computer system 12 via the network 16. The data may be embodied as numerical values indicative of the consumer's answer selection. For example, each possible answer may be assigned a numerical value from 1 to 5, which represents the amount of uniqueness or difference the consumer perceives for the current brand. However, in other embodiments, other numerical values and schema may be used to identify the particular uniqueness response of the consumer. Regardless, the computer system 12 is configured to store the consumer's answer to the uniqueness question presented in process step 92 in the database 22.

Subsequently, in process step 94, a product brand "newness" or "new information" question is presented to the consumer for the current brand. The newness question may be presented to the consumer by transmitting data representing the newness question from the computer system 12 to the remote computer 14 being operated by the consumer. The newness question may be embodied as any type of question or questions designed to determine to what extent the consumer has recently heard something new about the current brand. For example, in one particular embodiment the newness question is embodied as "I have recently heard something new about <BRAND>" Similar to the uniqueness question, the newness question includes a range of predetermined responses such that answers from the number of consumers may be pooled and analyzed. For example, in one particular embodiment, the possible answers to the newness question include "strongly agree", "agree", "neither agree nor disagree", "disagree", and "strongly disagree". The consumer may respond to the newness question by selecting one of the possible answers by, for example, selecting a button or the like presented in association with the desired answer on the display device 24 of the remote computer 14 being operated by the consumer.

In process step 98, the consumer's response to the newness question presented in process step 96 is determined. To do so, data indicative of the consumer's answer or selection is transmitted from the remote computer 14 to the computer system 12 via the network 16. The data may be embodied as numerical values indicative of the consumer's answer selection. For example, as discussed above in regard to the uniqueness question, each possible answer may be assigned a numerical value from 1 to 5, which represents to what extent the consumer has heard something new about the current brand. However, in other embodiments, other numerical values and schema may be used to identify the particular newness of the brand to the consumer. Regardless, the computer system 12 is configured to store the consumer's answer to the newness question presented in process step 96 in the database 22.

Once the rational response of the consumer to current product brand has been determined in process steps 92, 94, 96, and 98, the algorithm 90 determines if the consumer's rational response for another brand should be determined in process step 99. If so, the algorithm 90 loops back to process steps 92, 94, 96, and 98, in which the rational response of the consumer for the next product brand is determined using the same methodology as described above in regard to the process steps 92, 94, 96, and 98. The algorithm 70 continues to loop through process steps 92, 94, 96, and 98, until the consumer's rational response to each product brand presented to the consumer in process step 52 of the algorithm 50 has been determined. The consumer's 92, 94, 96, and 98, responses so determined are stored in the database 22 for later retrieval and analysis.

Referring now back to FIG. 2, once the consumer's rational response to the product brands has been determined in process step 60, in some embodiments, the background of the consumer is determined in process step 62. The background of the consumer may include any information related to the consumer that may be useful in interpreting or predicting brand preference. Knowledge of the background of the consumer may provide insight into the consumer's brand preference, emotional response to brands, and/or rational response to brands. Such knowledge may also be useful in determining advertisements directed to the particular consumer or consumer group.

Figure 6:
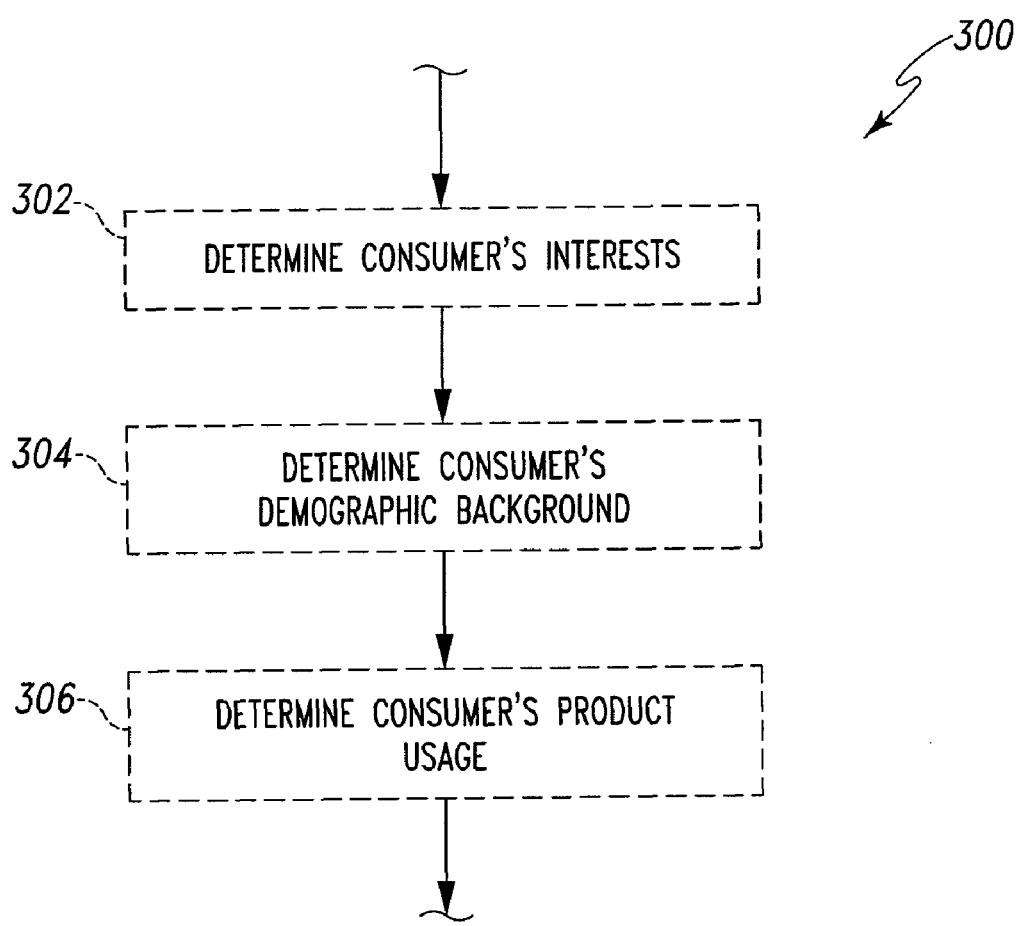
FIG. 6 is a flow diagram of another sub-routine of the algorithm of FIG. 2 for determining a background of a consumer.

Any methodology may be used to determine the background of the consumer in process step 62. For example, the consumer may be presented with a questionnaire designed to determine the consumer's background. The questionnaire may be presented to the consumer via the display device 24 of the remote computer 14 operated by the consumer. For example, as illustrated in FIG. 6, the computer system 12 may execute an algorithm 300 for determining a consumer's background. The algorithm 300 may have any number of process steps for determining information related to the consumer or the background of the consumer. For example, in one embodiment, the algorithm 300 includes a process step 302 in which the consumer's interests are determined. The interests of the consumer may be determined based on web sites visited by consumer. The various categories of interests determined for the pool of consumers may then be correlated to the product brand preferred by the consumer. For example, as illustrated in FIG. 10, a spreadsheet 172 may be presented to a user of the computer system 12 and/or a client or customer of the user of the computer system 12 on a suitable display device attached thereto. The spreadsheet 172 includes a column 174 listing various areas of interest, a column 176 listing the number of consumers who preferred a first product brand, and a column 178 listing a number of consumers who preferred a second product brand. The number of consumers listed in the columns 176, 178 is listed in rows according to the consumers' identified areas of interest. In this way, brand preference based on areas of consumer interest may be investigated. Although the illustrative spreadsheet 172 includes only two product brands, in other embodiments, the spreadsheet 172 may include any number of product brands arrayed in columns similar to columns 176, 178. For example, the number of product brand columns included in the spreadsheet 172 may be based on the number of individual product brands displayed to the consumers in process step 52.

As discussed above, the area of interests of the consumers may be based on the types of online web sites visited by the consumer over a period of time. As such, the pool of consumers may be selected from a group of consumers whose online activity is monitored. For example, in one particular embodiment, the pool of consumers whose brand preference is to be determined using the algorithm 50 is selected from a group of consumers whose areas of interest are commercially available from comScore Networks of Reston, Va.

Referring back to FIG. 6, the algorithm 300 for determining the consumer's background may also include a process step 304 in which the demographic background of the consumer is determined. To do so, the consumer may be presented with a questionnaire on the display device 24. The consumer's responses to the questionnaire are transmitted back to the computer system 12 via the network 16 and may be stored in the database 22. The consumer's demographic background may then be determined based on the consumer's response to the demographic questionnaire.

The algorithm 300 may further include a process step 306 in which the consumer's product usage is determined. That is, the degree (i.e., how often does the consumer use or purchase the product or brand) and/or type (i.e., is the consumer a retail consumer, etc.) of relationship the consumer has with the product or product brand is determined in process step 306. To do so, the consumer may be presented with a questionnaire on the display device 24. The consumer's responses to the questionnaire are transmitted back to the computer system 12 via the network 16 and may be stored in the database 22. The consumer's product usage may then be determined based on the consumer's response to the demographic questionnaire. As discussed above, in other embodiments, the algorithm 300 may include additional process steps for determining information related to the consumer.

Referring back to FIG. 2, once the areas of interest of the consumers are determined in process step 62, graphical representations of the brand preference, the emotional responses, and the rational responses of the pool of consumers are generated in process step 64. That is, the brand preference, the emotional response, and the rational response determined in process steps 56, 58, and 60, respectively, for each consumer are averaged to form a graphical representation of such responses. The graphical representations may be displayed to a user of or a client of a user of the computer system 12. For example, the graphical representations may be displayed to the client or user on a display device (not shown) coupled to the computer system 12 or may be displayed on a computer or similar device (not shown) of the client/customer of the user of the computer system 12 by transmitting data indicative of the graphical representations to the client's computer over the network 16.

The graphical representations may be embodied as any type of graphical representation capable of providing a visual indication of the average consumer brand preference, emotional response, and rational response. The graphical representations may be of the average consumer brand preference, emotional response, and/or rational response at a point in time (e.g., for a given month, quarter, or year) or may be presented as an average over a period of time (e.g., an average per quarter over a two year period). To do so, the process steps $52_1$-$52_n$ of algorithm 50 may be repeated over a period time such that a collection of consumer brand preference, consumer emotional responses, and consumer rational responses to the brand(s) is determined. Such collection of preferences and responses may be stored, for example, in the database 22. The average consumer brand preference, emotional response, and/or rational response over time may then be determined based on the stored data.

Figure 11:
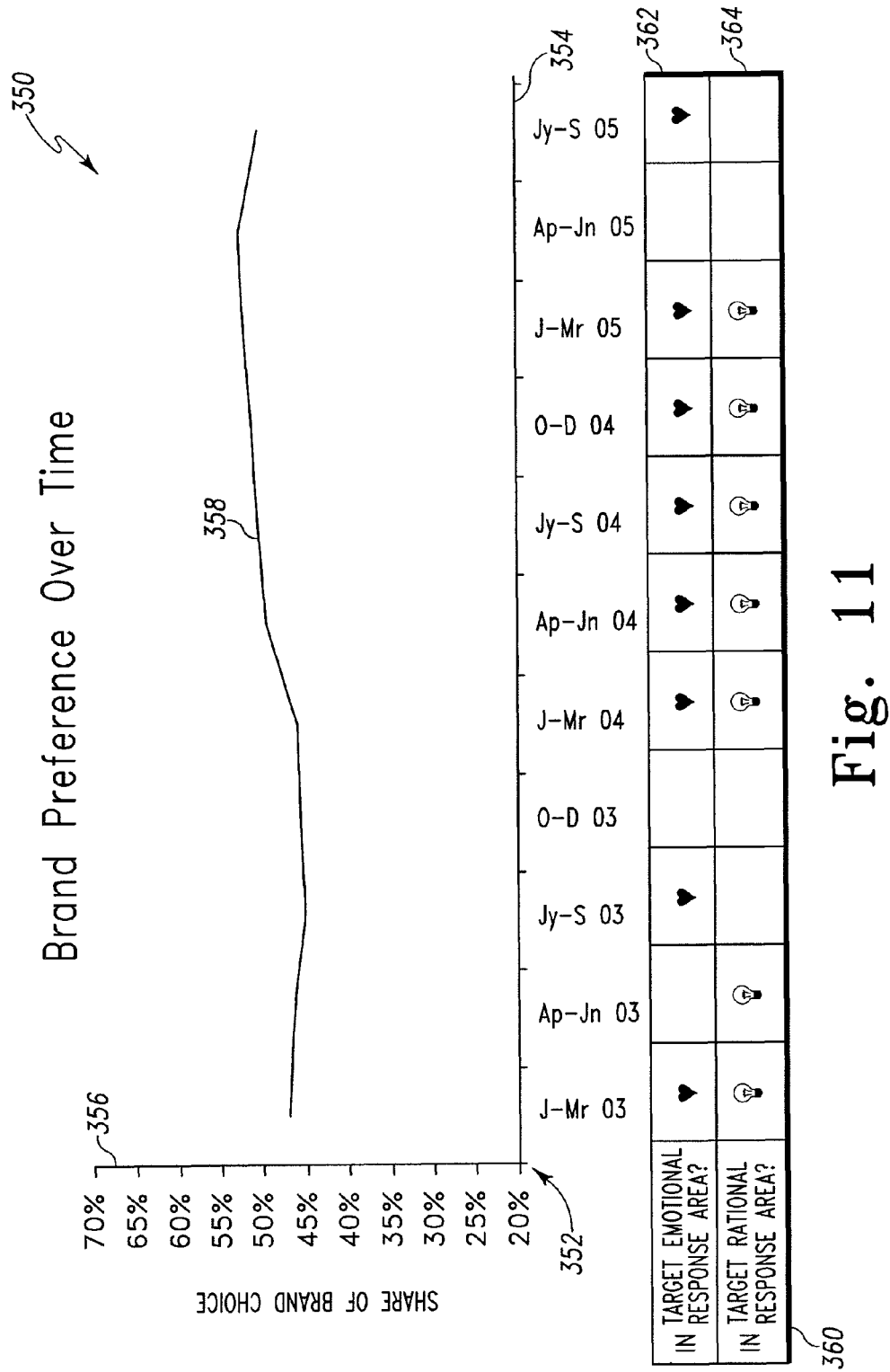
FIG. 11 is a graph of consumer brand preference for a brand over time.

For example, in one embodiment, the graphical representation for the average brand preference of the pool of consumers is embodied as a graph 350 of the average consumer brand preference over time as illustrated in FIG. 11. The graph 350 includes a line graph 352 having an abscissa axis 354 graduated in year quarter time periods and an ordinate axis 356 graduated in units of share of brand choice. The line graph 352 includes a plot line 358 of the average brand preference over the period of time illustrated in the abscissa axis 354. As such, the user or client of the user of the computer system 12 can quickly discern the trend of consumer preference over time.

The graph 350 also includes a response graph 360 displayed below the line graph 352. The response graph 360 includes an emotional response row 362 and a rational response row 364. Each of the rows 362, 364 include columns correlated to each period of time illustrated on the abscissa axis 354 of the line graph 352. Indicia is displayed in the columns of the emotional response row 362 for those time periods in which the average emotional response of the pool of consumers was within a predetermined target zone (e.g., the target emotional response area 192 illustrated in and discussed below in regard to FIG. 12). Indicia is also displayed in the columns of the rational response row 364 for those time periods in which the average rational response of the pool of consumers was within a predetermined target zone (e.g., the target rational response area 208 illustrated in and discussed below in regard to FIG. 14). As such, the average consumer brand preference for a product brand over time is presented to the user or client of the user of the computer system 12 via the graph 350. Because the graph 350 also includes indicia of the emotional and rational responses over time, correlations between the emotional and rational responses of the consumers to the product brand and the average brand preference over time may be extracted from the graph 350. Such information may be used, for example, in developing advertisement campaigns, spending budgets, or the like.

Figure 12:
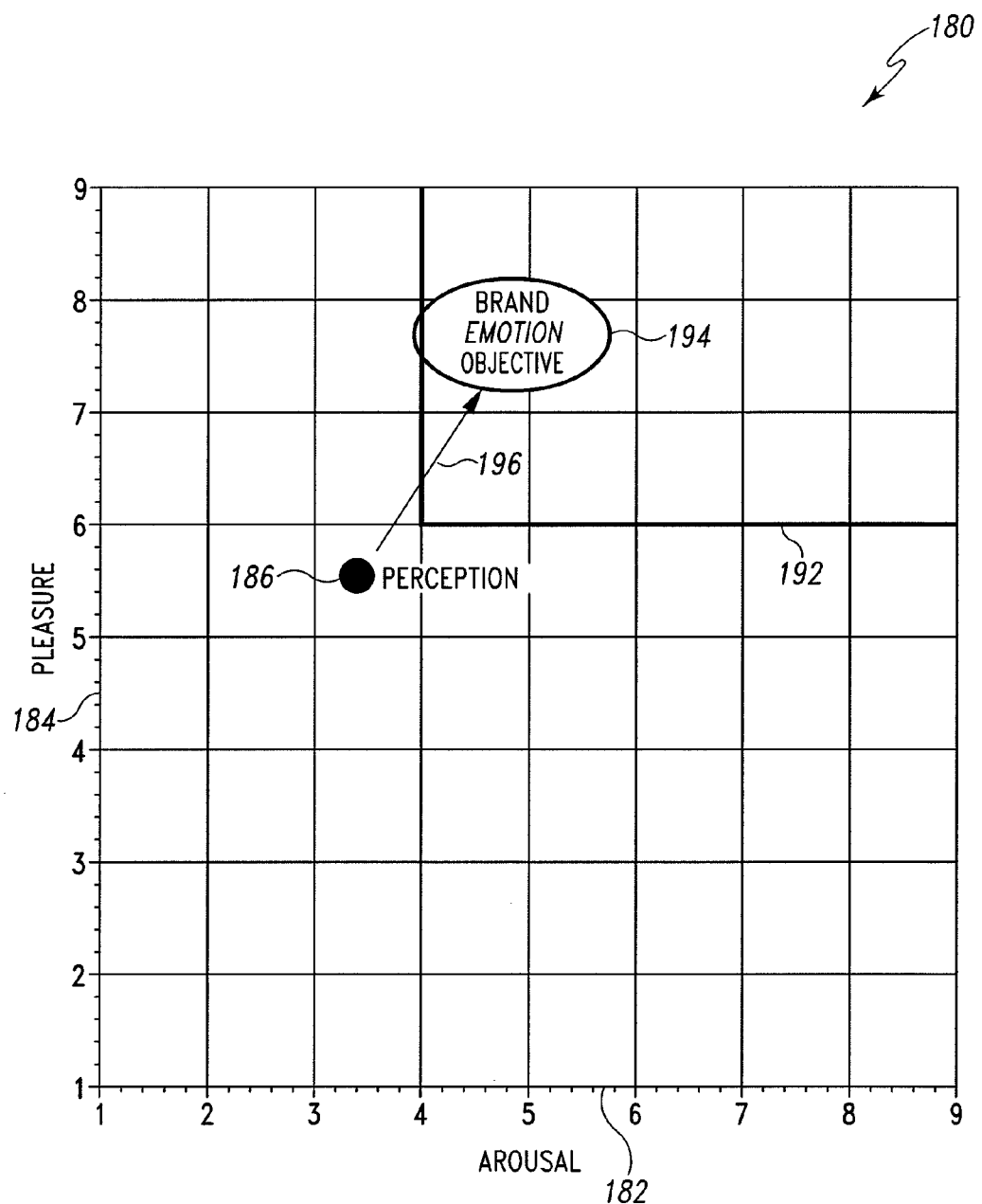
FIG. 12 is a graph of an average emotional response of the number of consumers as determined in the algorithm of FIG. 2.

A graphical representation for the average emotional response of the consumers to the product brands is also generated in process step 64. For example, in one embodiment, the graphical representation for the emotional responses of the pool of consumers may be embodied as a graph 180. The graph 180 includes an abscissa axis 182 being graduated in units of arousal and an ordinate axis 184 being graduated in units of pleasure. The units of arousal and pleasure may be embodied as numerical values as illustrated in FIG. 12 or may be embodied as percentages. An indicator 186 is located on the graph 180 to indicate the average emotional response of the consumers. That is, the indicator 186 represents a two-dimensional value indicative of the emotional response of the consumers. The two-dimensional value includes a pleasure component and an arousal component. The two-dimensional value is determined in process step 64 by averaging the emotional response values of the consumers as determined in the process steps $58_1$-$58_n$. Accordingly, a user of or a client/customer of a user of the computer system 12 may visualize the average emotional response of consumers to a product brand by analyzing the graph 180.

Figure 13:
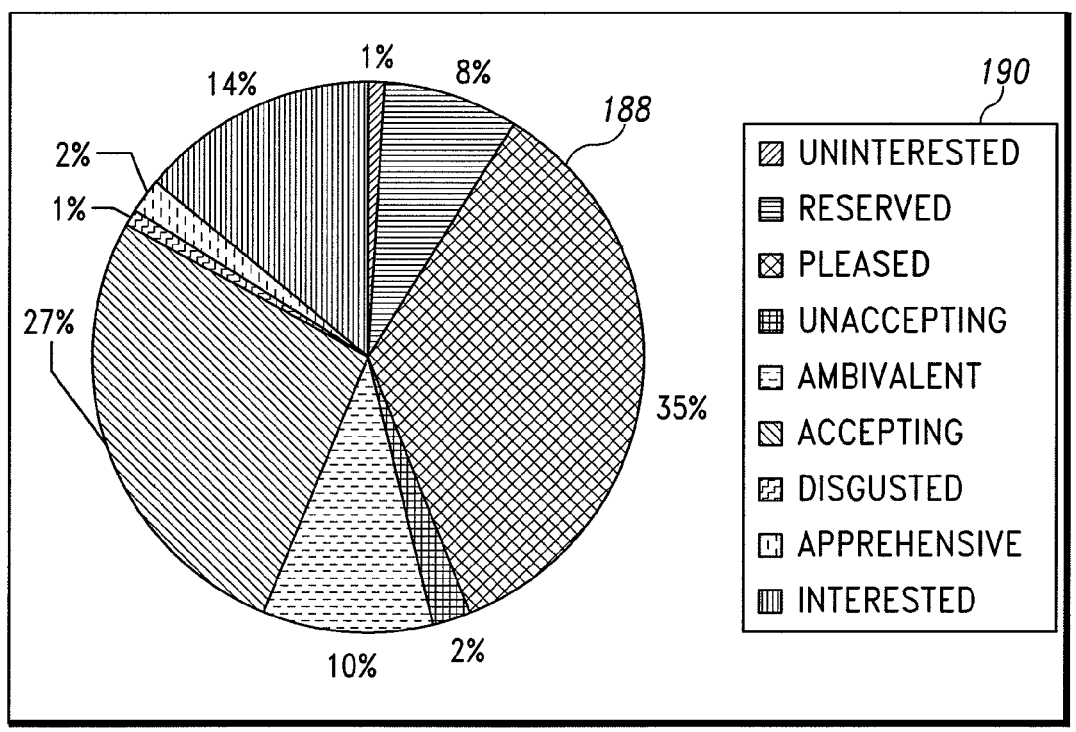
FIG. 13 is a pie chart illustrating various emotional responses to one of the number of brands by the number of consumers as determined in the algorithm of FIG. 2.

The indicator 186 located on the graph 180 may be further visualized as a pie graph 188 as illustrated in FIG. 13. The pie graph 188 illustrates the percentages of emotional responses as determined based on the combined pleasure, arousal, and dominance responses of the consumers determined in process step 58. The pie graph 188 includes a legend 190 providing information as to the category of emotional response of each "slice" of the pie graph 188. The pie graph 188 allows the user or client/customer of the user of the computer system 12 to analyze the emotional responses and determine conclusions based thereon. For example, a poor pleasure emotional score for the brand may be indicated by a large "ambivalent" percentage of the pie graph 188. As such, the pie graph 188 may provide insight as to why the consumer's feel the way they do about the individual product brands.

Figure 14:
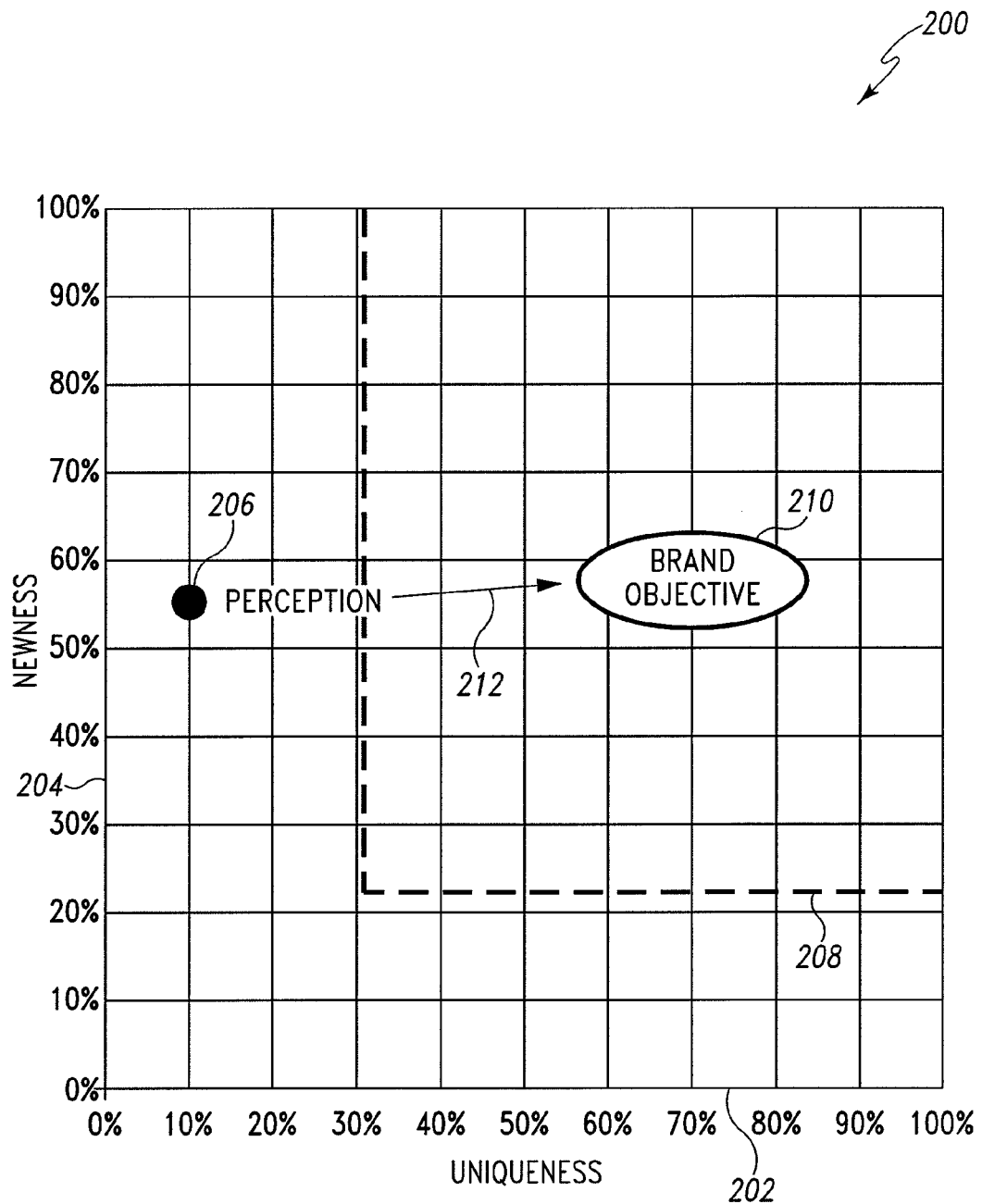
FIG. 14 is a graph of an average rational response of the number of consumers as determined in the algorithm of FIG. 2.

Additionally, a graphical representation for the average rational response of the consumers to the product brands is also generated in process step 64. For example, in one embodiment, the graphical representation for the rational responses of the pool of consumers is embodied as a graph 200 as illustrated in FIG. 14. The graph 200 includes an abscissa axis 202 being graduated in units of uniqueness and an ordinate axis 204 being graduated in units of newness (i.e., the consumer(s) have heard something new about the brand). The units of uniqueness and newness may be embodied as percentages illustrated in FIG. 14 or may be embodied as numerical values. An indicator 206 is located on the graph 200 to indicate the average rational response of the consumers. That is, the indicator 206 represents a two-dimensional value indicative of the rational response of the consumers. The two-dimensional value includes a uniqueness component and a newness component. The two-dimensional value is determined in process step 64 by averaging the rational response values of the consumers as determined in the process steps $60_1$-$60_n$. Accordingly, a user of or a client/customer of a user of the computer system 12 may visualize the average rational response of consumers to a product brand by analyzing the graph 200.

The graph 180 of the consumer's average emotional response and the graph 200 of the consumer's average rational response to the product brand may provide insight to reasons behind the brands chosen by the consumers in process step 54. That is, the way the consumer perceives the brand(s), both emotionally and rationally, may explain why the consumer preferred one brand over the others. In addition, such insight may be usable to improve the brand preference of a brand of interest by determining a target emotional and rational response for the consumers in regard to the brand of interest in process step 66. To do so, a target emotional response area 192 may be determined and defined on the graph 180 of the average emotional response of the consumers as illustrated in FIG. 12. The target emotional response area 192 defines an area of the graph having average pleasure and arousal responses of desirable amounts. In particular, a target emotional response point 194 may be defined on the graph 180. The target emotional response point 194 lies within the target emotional response area 192. By determining a distance 196 between the indicator 186 and the target emotional response point 194, the average required increase or improvement of consumer's emotional response to the brand can be determined. By increasing the average emotional response of the consumers to the point 194 or within the target area 192, the brand preference of the brand of interest may be increased. That is, by improving or changing those factors affecting the emotional response of consumer's to the brand, the overall brand preference may be improved.

Similarly, a target rational response area 208 may be determined and defined on the graph 200 of the average rational response of the consumers as illustrated in FIG. 14. The target rational response area 208 defines an area of the graph having average uniqueness and newness responses of desirable amounts. In particular, a target rational response point 210 may be defined on the graph 200. The target rational response point 210 lies within the target rational response area 208. By determining a distance 212 between the indicator 206 and the target rational response point 210, the average required increase or improvement of consumer's rational response to the brand can be determined. By increasing the average rational response of the consumers to the point 210 or within the target area 208, the brand preference of the brand of interest may be increased. That is, by improving or changing those factors affecting the rational response of consumer's to the brand, the overall brand preference may be improved.

There are a plurality of advantages of the present disclosure arising from the various features of the system and methods described herein. It will be noted that alternative embodiments of each of the system and methods of the present disclosure may not include all of the features described yet still benefit from at least some of the advantages of such features. Those of ordinary skill in the art may readily devise their own implementations of systems and methods that incorporate one or more of the features of the present invention and fall within the spirit and scope of the present disclosure.

For example, although the software concepts disclosed herein are described as already being loaded or otherwise maintained on a computing device (e.g., a computer system), it should be appreciated that the present disclosure is intended to cover the software concepts described herein irrespective of the manner in which such software concepts are disseminated. For instance, the software concepts of the present disclosure, in practice, could be disseminated via any one or more types of a recordable data storage medium such as a modulated carrier signal, a magnetic data storage medium, an optical data storage medium, a biological data storage medium, an atomic data storage medium, and/or any other suitable storage medium.

What is claimed is:

1. A method for determining brand preference for a plurality of consumers, the method comprising:
    presenting, on a computer system, images of a plurality of different brands of a predetermined product to a consumer from the plurality of consumers;
    determining, on the computer system, a brand selected by the consumer from the plurality of different brands;
    presenting to the consumer, on the computer system, a plurality of emotional response questions for the selected brand;
    displaying, on the computer system, a plurality of non-textual, pictorial icons indicative of a range of emotional responses of the consumer to the plurality of emotional response questions for the selected brand, the plurality of icons comprising (i) a first set of icons, each icon of the first set of icons being indicative of a discrete level of pleasure experienced by the consumer in response to the selected brand, and (ii) a second set of icons, each icon of the second set of icons being indicative of a discrete level of arousal experienced by the consumer in response to the selected brand;
    determining, on the computer system, a pleasure response value of the consumer to the selected brand based on a selection of an icon from the first set of icons, and an arousal response value of the consumer to the selected brand based on a selection of an icon from the second set of icons:
    presenting to the consumer, on the computer system, at least one uniqueness question and at least one newness question related to the selected brand;
    determining, on the computer system and in response to the at least one uniqueness question and the at least one newness question, a uniqueness response value indicative of the consumer's opinion of the uniqueness of the selected brand and a newness response value indicative of the extent to which the consumer has recently experienced new information about the selected brand;
    calculating, for a plurality of time periods, an average pleasure response value, an average arousal response value, an average uniqueness response value, and an average newness response value, based on plural pleasure response values, plural arousal response values, plural uniqueness response values, and plural newness response values, respectively, collected from the plurality of consumers during said plurality of time periods;
    determining, for each of the plurality of time periods, whether the average pleasure response value and the average arousal response value are within a predetermined emotional response range;
    determining, for each of the plurality of time periods, whether the average uniqueness response value and the average newness response value are within a predetermined rational response range;
    for each of the plurality of time periods, calculating a share of brand choice for the selected brand as the number of times the selected brand was selected by a consumer during one of the plurality of time periods divided by the total number of brand selections by the plurality of consumers among the plurality of different brands during said one of the plurality of time periods;
    displaying a graphical representation of the share of brand choice for the selected brand over the plurality of time periods along with an indication of whether the average pleasure response value and the average arousal response value are within a predetermined emotional response range for each of the plurality of time periods, and an indication of whether the average uniqueness response value and the average newness response value are within a predetermined rational response range for each of the plurality of time periods.

2. The method of claim 1, wherein displaying images of the plurality of brands comprises displaying images of the brands to the consumer over a network.

3. The method of claim 1, wherein the presenting step comprises displaying a logo of each of the plurality of brands to the consumer.

4. The method of claim 1, wherein the presenting step comprises displaying text including the names of each of the plurality of brands to the consumer.

5. The method of claim 1, wherein determining the brand selected by the consumer comprises receiving data indicative of a selection of the consumer over a network.

6. The method of claim 1, further comprising generating, on the computer system, a graph having a pleasure axis and an arousal axis and generating indicia on the graph indicative of an average pleasure response and an average arousal response to the selected brand by a number of consumers.

7. The method of claim 6, further comprising generating indicia on the graph indicative of a desired emotional response of the consumer to the selected brand.

8. The method of claim 1, further comprising generating, on the computer system, a graph having a uniqueness axis and a new information axis and generating indicia on the graph indicative of an average of values indicative of the uniqueness of the selected brand to a number of consumers and an average of values indicative of whether the number of consumers has experienced new information concerning the selected brand.

9. The method of claim 8, further comprising generating indicia on the graph indicative of a desired rational response of the consumer to the selected brand.

10. The method of claim 1, further comprising determining, on the computer system, the interests of the consumer.

11. The method of claim 10, wherein determining the interests of the consumer comprises determining the interests of the consumer based on web sites visited by the consumer.

12. The method of claim 1, further comprising determining, on the computer system, the demographic background of the consumer.

13. The method of claim 1, further comprising determining, on the computer system, a value indicative of the number of times the consumer purchases the product over a predetermined amount of time.

14. A computer system comprising:
a processor; and
a memory device coupled with the processor, the memory device having stored therein a plurality of instructions, which when executed by the processor, cause the processor to:
transmit images of a plurality of different brands of a predetermined product to a consumer from the plurality of consumers;
receive a selection by the consumer of a brand from the plurality of different brands;
transmit to the consumer a plurality of emotional response questions for the selected brand;
transmit a plurality of non-textual, pictorial icons indicative of a range of emotional responses of the consumer to the plurality of emotional response questions for the selected brand, the plurality of icons comprising (i) a first set of icons, each icon of the first set of icons being indicative of a discrete level of pleasure experienced by the consumer in response to the selected brand, and (ii) a second set of icons, each icon of the second set of icons being indicative of a discrete level of arousal experienced by the consumer in response to the selected brand determine a pleasure response value of the consumer to the selected brand based on a selection of an icon from the first set of icons, and an arousal response value of the consumer to the selected brand based on a selection of an icon from the second set of icons;

transmit to the consumer at least one uniqueness question and at least one newness question related to the selected brand;

determine, in response to the at least one uniqueness question and the at least one newness question, a uniqueness response value indicative of the consumer's opinion of the uniqueness of the selected brand and a newness response value indicative of the extent to which the consumer has recently experienced new information about the selected brand;

calculate, for a plurality of time periods, an average pleasure response value, an average arousal response value, an average uniqueness response value, and an average newness response value, based on plural pleasure response values, plural arousal response values, plural uniqueness response values, and plural newness response values, respectively, collected from the plurality of consumers during said plurality of time periods;

determine, for each of the plurality of time periods, whether the average pleasure response value and the average arousal response value are within a predetermined emotional response range;

determine, for each of the plurality of time periods, whether the average uniqueness response value and the average newness response value are within a predetermined rational response range;

for each of the plurality of time periods, calculate a share of brand choice for the selected brand as the number of times the selected brand was selected by a consumer during one of the plurality of time periods divided by the total number of brand selections by the plurality of consumers among the plurality of different brands during said one of the plurality of time periods;

display a graphical representation of the share of brand choice for the selected brand over the plurality of time periods along with an indication of whether the average pleasure response value and the average arousal response value are within a predetermined emotional response range for each of the plurality of time periods, and an indication of whether the average uniqueness response value and the average newness response value are within a predetermined rational response range for each of the plurality of time periods.

15. The computer system of claim 14, wherein to transmit images of the plurality of brands to a consumer comprises to transmit images of the brands over a network.

* * * * *